UNITED STATES PATENT OFFICE.

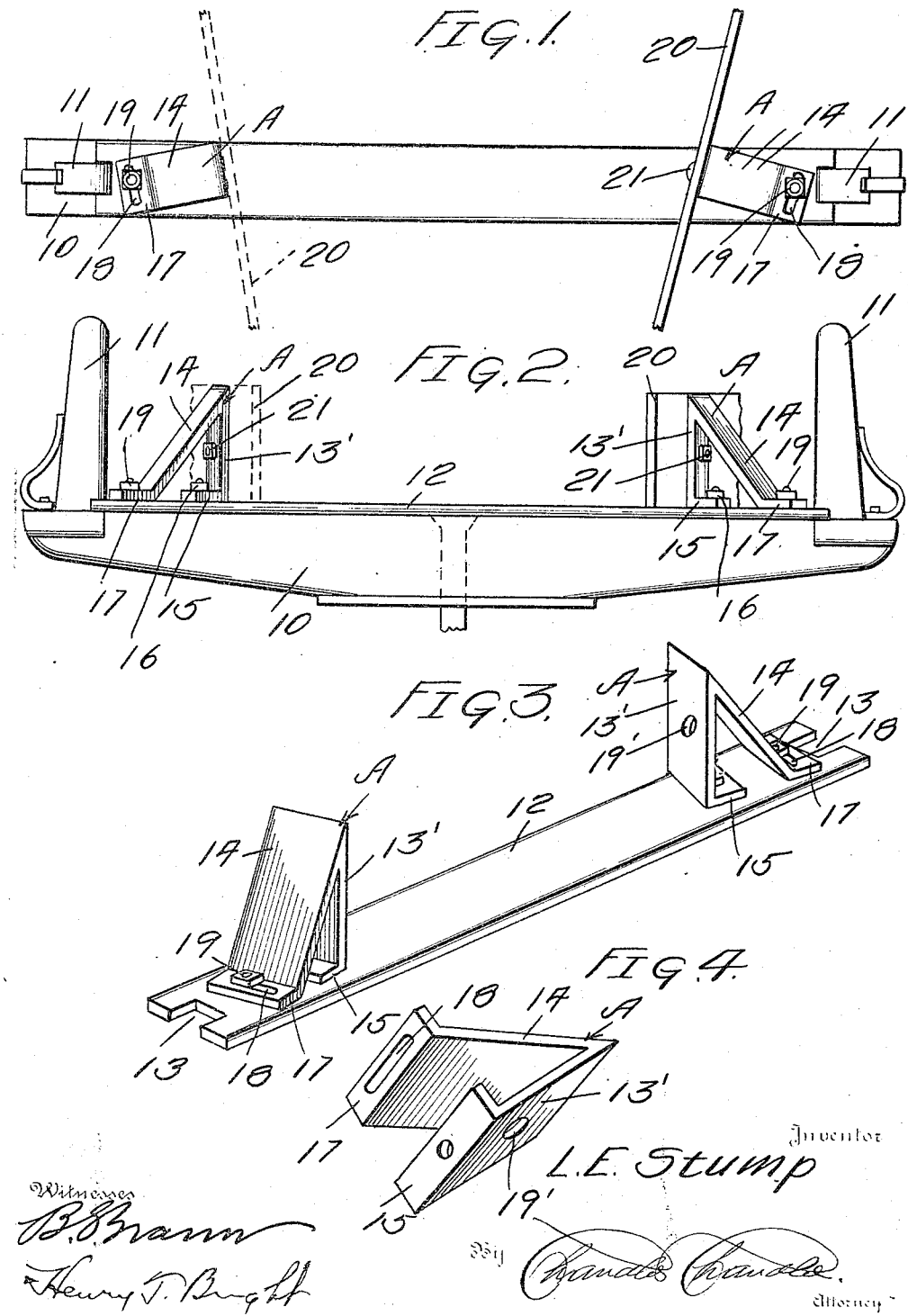

LEVI E. STUMP, OF CHANUTE, KANSAS.

HAY-RACK ATTACHMENT FOR WAGON-BOLSTERS.

1,155,015.   Specification of Letters Patent.   Patented Sept. 28, 1915.

Application filed March 22, 1915. Serial No. 16,113.

*To all whom it may concern:*

Be it known that I, LEVI EARL STUMP, a citizen of the United States, residing at Chanute, in the county of Neosho, State of Kansas, have invented certain new and useful Improvements in Hay-Rack Attachments for Wagon-Bolsters; and I do hereby declare the following to be a full, clear, and exact description of the invention, such as will enable others skilled in the art to which it appertains to make and use the same.

This invention relates to hay rack attachments for wagon bolsters.

The object of the invention resides in the provision of an attachment of the type named which may be readily applied to and removed from a wagon bolster, and when so applied, after the wagon box has been removed, will convert the wagon into a hay rack.

A further object of the invention resides in the provision of an attachment of the character referred to in which the brackets of the attachment to which the side rails are secured may be adjusted into different angular relations with respect to the longitudinal axis of the wagon so as to readily conform to varying conditions.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a wagon bolster having the attachment associated therewith and one of the rack sills in dotted lines; Fig. 2, a front view of what is shown in Fig. 1; Fig. 3, a perspective view of the attachment removed, and Fig. 4, a perspective view of one of the brackets of the attachment.

Referring to the drawings 10 indicates a wagon bolster which embodies the usual standards 11.

The attachment is shown as comprising a base 12 provided at each end with a recess 13 adapted to receive the standards 11 when the base is seated upon the bolster 10 and whereby the attachment is detachably interlocked with the bolster. Mounted on the base 10 adjacent each end thereof is a bracket A and each of these brackets is substantially V-shape and includes arms 13' and 14. The arms 13' of said brackets terminate at their outer ends respectively in laterally directed portions 15 disposed at right angles to arms 13' and secured to the base 12 by means of a bolt 16. It will be noted that the arms 13' are disposed in a plane at right angles to the base 12. The free ends of the arms 14 of the brackets A also terminate respectively in laterally directed portions 17 each of which is provided with an elongated slot 18 having engaged therethrough a bolt 19 carried by the base 12 and whereby the angularity of the bracket with respect to the longitudinal axis of the wagon may be varied as will be obvious. Each of the arms 13' is provided with a bolt opening 19' whereby the rack sills 20 may be secured against arms 13' through the medium of bolts 21.

What is claimed is:—

A hay rack attachment for wagon bolsters comprising a base having recesses in its ends adapted to detachably receive the standards of the bolster, brackets mounted on said base, each of said brackets being substantially V-shape and having the free ends of its arm terminating in laterally directed portions, the laterally directed portion of the outermost arm being provided with an elongated slot, a bolt carried by the base and engaged through said slot, and a bolt carried by the base and engaged through the laterally directed portion of the inner arm, whereby the bracket can be adjusted into different angular relations with respect to the longitudinal axis of a wagon.

In testimony whereof, I affix my signature, in the presence of two witnesses.

LEVI E. STUMP.

Witnesses:
F. W. MONTAGUE,
M. M. MONTAGUE.